(12) United States Patent
Knott

(10) Patent No.: US 11,792,502 B2
(45) Date of Patent: *Oct. 17, 2023

(54) IMAGE CAPTURE DEVICE WITH SCHEDULED CAPTURE CAPABILITY

(71) Applicant: GoPro, Inc., San Mateo, CA (US)

(72) Inventor: Michael Adkins Knott, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/064,001

(22) Filed: Dec. 9, 2022

(65) Prior Publication Data

US 2023/0106518 A1 Apr. 6, 2023

Related U.S. Application Data

(63) Continuation of application No. 17/449,407, filed on Sep. 29, 2021, now Pat. No. 11,528,409, which is a continuation of application No. 16/947,368, filed on Jul. 29, 2020, now Pat. No. 11,140,313.

(51) Int. Cl.
*H04N 23/62* (2023.01)
*H04N 23/63* (2023.01)
*H04N 23/51* (2023.01)

(52) U.S. Cl.
CPC ........... *H04N 23/62* (2023.01); *H04N 23/631* (2023.01); *H04N 23/51* (2023.01)

(58) Field of Classification Search
CPC ...... H04N 23/51; H04N 23/62; H04N 23/631; H04N 23/634; H04N 23/667
See application file for complete search history.

(56) References Cited

U.S. PATENT DOCUMENTS

| | | | |
|---|---|---|---|
| 10,444,005 B1 * | 10/2019 | Dryer | ............. G06T 7/60 |
| 10,997,697 B1 * | 5/2021 | Newman | ........... H04N 23/6812 |
| 11,140,313 B1 | 10/2021 | Knott | |
| 11,350,026 B1 | 5/2022 | Manzari | |
| 11,528,409 B2 | 12/2022 | Knott | |
| 2012/0011456 A1 * | 1/2012 | Noda | ............. G06F 3/04845 |
| | | | 715/847 |
| 2016/0105644 A1 * | 4/2016 | Smith | ............. G08B 13/19667 |
| | | | 348/159 |
| 2018/0348815 A1 | 12/2018 | Popalis | |
| 2019/0014242 A1 | 1/2019 | Piekarski | |
| 2019/0068915 A1 * | 2/2019 | Okada | ........... H04N 5/85 |
| 2019/0138951 A1 | 5/2019 | Brownhill | |
| 2020/0314322 A1 | 10/2020 | Cao | |
| 2022/0038617 A1 | 2/2022 | Knott | |

* cited by examiner

*Primary Examiner* — Amy R Hsu
(74) *Attorney, Agent, or Firm* — ESPLIN & ASSOCIATES, PC

(57) ABSTRACT

A user interface of an image capture device may provide options for a user to schedule future capture of visual content by the image capture device. The user may interact with the options to specify the start time and the capture duration for the future capture of visual content. Information on scheduled future capture of visual content may be presented on one or more displays.

20 Claims, 8 Drawing Sheets

IMAGE CAPTURE DEVICE WITH SCHEDULED CAPTURE CAPABILITY

FIELD

This disclosure relates to image capture device with capability to schedule future capture of video.

BACKGROUND

A user may know in advance when the user wishes to capture a video. Image capture devices may not allow for the user to specify a future time to start the recording and how long the image capture device should record in the future.

SUMMARY

This disclosure relates to image capture devices that enables scheduled capture of video. An image capture device may include a housing. The housing may carry one or more of an image sensor, an optical element, a display, and/or other components. The optical element may guide light within a field of view to the image sensor. The image sensor may generate a visual output signal conveying visual information based on light that becomes incident thereon. The visual information may define visual content. The display may be configured to visually present information.

A scheduled capture user interface may be presented on the display. The scheduled capture user interface may include one or more schedule options for a user to schedule future capture of the visual content. User scheduling of the future capture of the visual content may include the user setting a start time at which the image capture device is to start capture of the visual content and a capture duration for which the image capture device is to capture the visual content. User interaction with the one or more schedule options to schedule the future capture of the visual content may be determined. Responsive to the user scheduling the future capture of the visual content, the image capture device may be configured to start capture of the visual content at the start time for the capture duration. Configuration of the image capture device to start capture of the visual content at the start time for the capture duration may allow usage of the image capture device to capture other content before the start time. The capture of the visual content for the capture duration may be started at the start time.

An electronic storage may store visual information, information relating to visual content, information relating to user interface, information relating to schedule options, information relating to future capture of visual content, information relating to user scheduling future capture of visual content, information relating to configuration of image capture device, information relating to start time, information relating to capture duration, and/or other information.

The housing may carry one or more components of the image capture device. The housing may carry (be attached to, support, hold, and/or otherwise carry) one or more of an image sensor, an optical element, a display, a processor, an electronic storage, and/or other components.

The image sensor may be configured to generate a visual output signal and/or other output signals. The visual output signal may be generated by the image sensor based on light that becomes incident thereon. The visual output signal may convey visual information and/or other information. The visual information may define visual content.

The optical element may be configured to guide light within a field of view to the image sensor. The field of view may be less than 180 degrees. The field of view may be equal to 180 degrees. The field of view may be greater than 180 degrees.

The display may be configured to visually present information. The display may be configured to present visual content, user interface, schedule options, and/or other information.

The processor(s) may be configured by machine-readable instructions. Executing the machine-readable instructions may cause the processor(s) to facilitate scheduled capture of video. The machine-readable instructions may include one or more computer program components. The computer program components may include one or more of a user interface component, a user interaction component, a scheduled capture component, a capture component, and/or other computer program components.

The user interface component may be configured to present a scheduled capture user interface and/or other user interface on the display. The scheduled capture user interface may include one or more schedule options for a user to schedule future capture of the visual content. User scheduling of the future capture of the visual content may include the user setting (1) a start time at which the image capture device is to start capture of the visual content and (2) a capture duration for which the image capture device is to capture the visual content.

In some implementations, the schedule option(s) for the user to schedule the future capture of the visual content may include (1) a start capture option for the user to set the start time at which the image capture device is to start capture of the visual content, (2) a capture duration option for the user to set the capture duration for which the image capture device is to capture the visual content, and/or other options.

In some implementations, the schedule option(s) for the user to schedule the future capture of the visual content may include (1) a start capture option for the user to set the start time at which the image capture device is to start capture of the visual content, (2) an end capture option for the user to set an end time at which the image capture device is to end capture of the visual content, and/or other options. The capture duration may be defined by difference between the start capture time and the end capture time.

The user interaction component may be configured to determine user interaction with the one or more schedule options to schedule the future capture of the visual content.

The scheduled capture component may be configured to, responsive to the user scheduling the future capture of the visual content, configure the image capture device to start capture of the visual content at the start time for the capture duration. Configuration of the image capture device to start capture of the visual content at the start time for the capture duration may allow usage of the image capture device to capture other content before the start time.

In some implementations, responsive to the image capture device being on proximate to the start time, a scheduled capture alert may be presented on the display. The scheduled capture alert may include a countdown to the start time and the capture duration.

In some implementations, responsive to the image capture device being off or in a standby mode proximate to the start time, the image capture device may be activated for the scheduled future capture of the visual content.

In some implementations, one or more modify options may be presented for the user (1) to modify the start time at which the image capture device is to start the capture of the visual content, and/or (2) to modify the capture duration for which the image capture device is to capture the visual content.

The capture component may be configured to start the capture of the visual content for the capture duration at the start time. In some implementations, the modify option(s) to modify the capture duration for which the image capture device is to capture the visual content may be enabled during the capture of the visual content.

In some implementations, the scheduled future capture of the visual content may be associated with a capture setting before the start time. The capture of the visual content may be performed by the image capture device using the capture setting. In some implementations, the capture setting associated with the scheduled future capture of the visual content may be identified by a clock icon in a list of capture settings.

In some implementations, the scheduled future capture of the visual content may not be associated with a capture setting before the start time. The capture of the visual content may be performed by the image capture device using a current capture setting.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
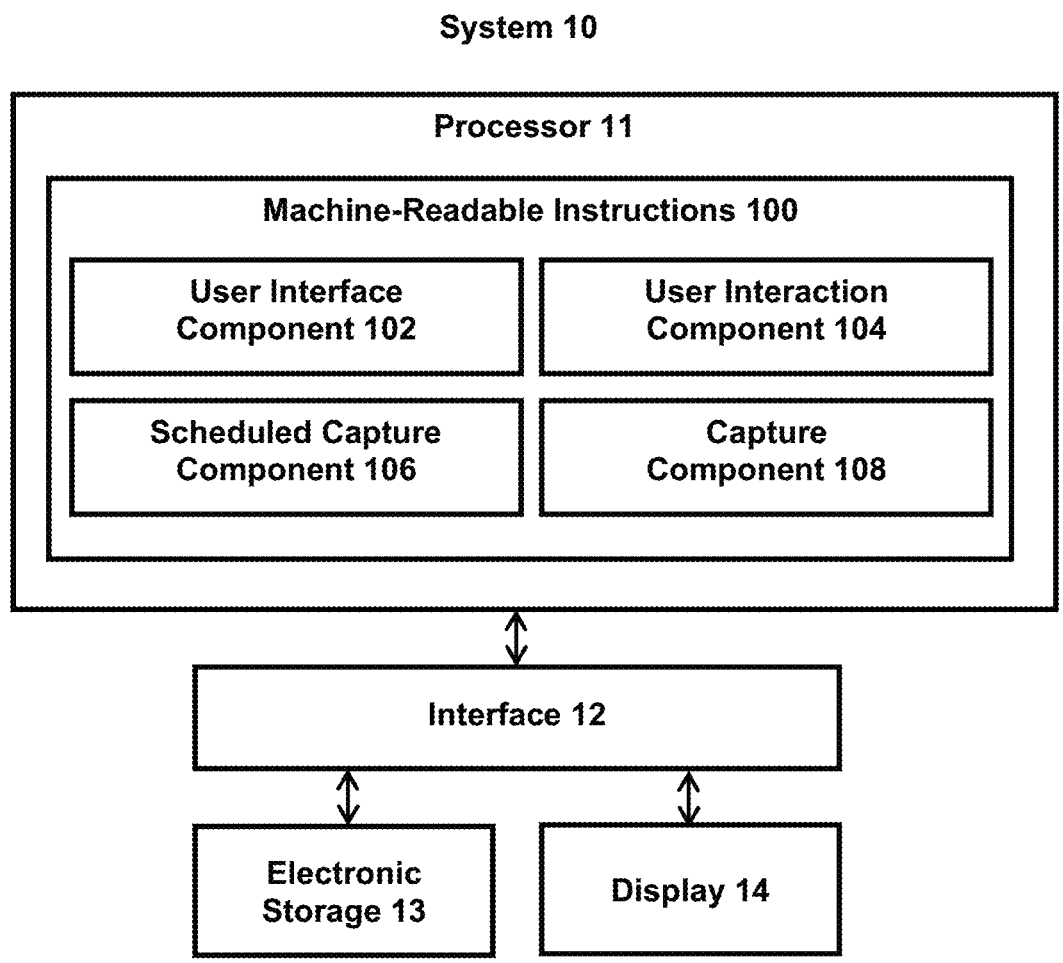
FIG. 1 illustrates an example system that schedules future capture of video.

FIG. 1 illustrates a system 10 for that enables scheduled capture of video. The system 10 may include one or more of a processor 11, an interface 12 (e.g., bus, wireless interface), an electronic storage 13, a display 14, and/or other components. The system 10 may include and/or be part of an image capture device. The image capture device may include a housing, and one or more of an image sensor, an optical element, the processor 11, the electronic storage 13, the display 14, and/or other components of the system 10 may be carried by the housing the image capture device. The optical element may guide light within a field of view to the image sensor. The image sensor may generate a visual output signal conveying visual information based on light that becomes incident thereon. The visual information may define visual content. The display 14 may be configured to visually present information.

A scheduled capture user interface may be presented on the display 14. The scheduled capture user interface may include one or more schedule options for a user to schedule future capture of the visual content. User scheduling of the future capture of the visual content may include the user setting a start time at which the image capture device is to start capture of the visual content and a capture duration for which the image capture device is to capture the visual content. User interaction with the one or more schedule options to schedule the future capture of the visual content may be determined by the processor 11. Responsive to the user scheduling the future capture of the visual content, the image capture device may be configured by the processor 11 to start capture of the visual content at the start time for the capture duration. Configuration of the image capture device to start capture of the visual content at the start time for the capture duration may allow usage of the image capture device to capture other content before the start time. The capture of the visual content for the capture duration may be started at the start time by the processor 11.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to visual content, information relating to user interface, information relating to schedule options, information relating to future capture of visual content, information relating to user scheduling future capture of visual content, information relating to configuration of image capture device, information relating to start time, information relating to capture duration, and/or other information.

Visual content and/or audio content may be captured by an image capture device. Visual content may refer to content of image(s), video frame(s), and/or video(s) that may be consumed visually. Audio content may refer to media content that may be consumed as one or more sounds. Audio content may include one or more sounds stored in one or more formats/containers, and/or other audio content. Audio content may include one or more sounds captured by one or more sound sensors (e.g., microphone).

For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view and/or audio content may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content captured by an image capture device be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). For example, information defining visual content (visual information) may be stored within a single file or multiple files. Visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or be a part of the system 10. One or more portions of the system 10 may be remote from or be a part of the image capture device.

Figure 3:
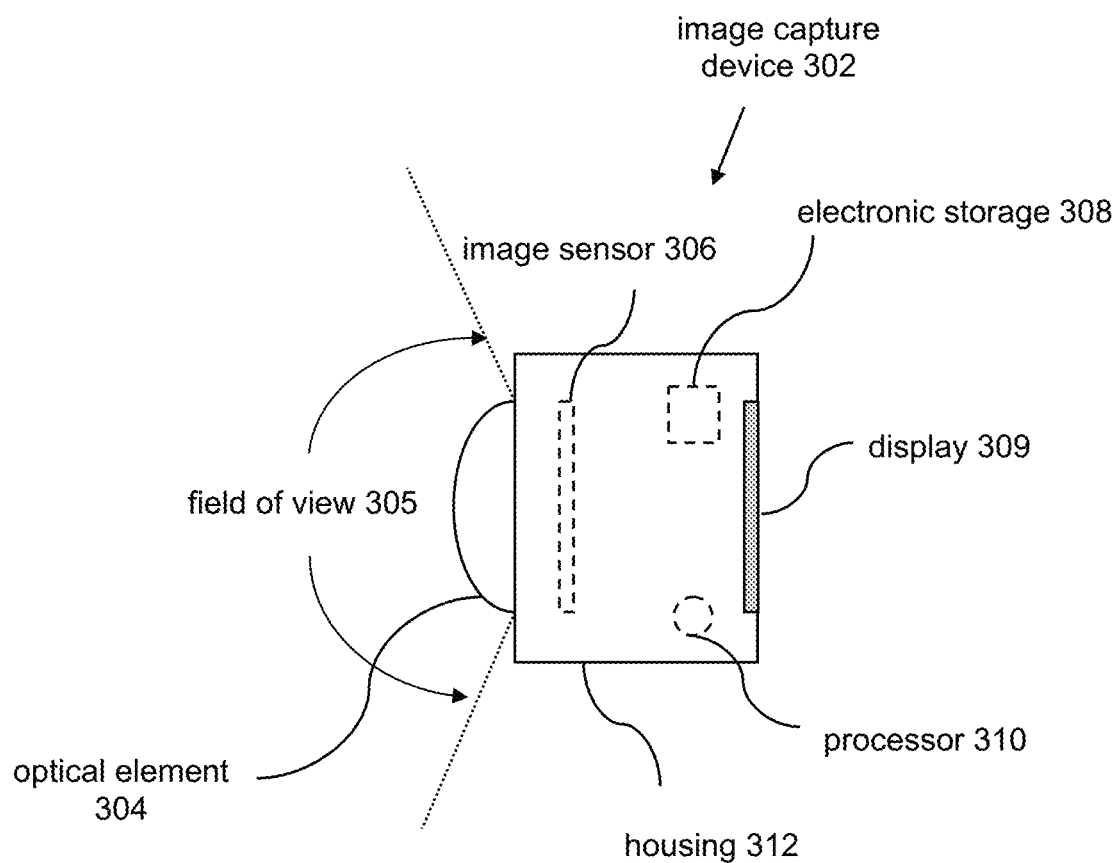
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, an electronic storage 308, a display 309, a processor 310, and/or other components.

One or more components of the image capture device 302 may be the same as, be similar to, and/or correspond to one or more components of the system 10. For example, the processor 310 may be the same as, be similar to, and/or correspond to the processor 11. The electronic storage 308 may be the same as, be similar to, and/or correspond to the electronic storage 13. The display 309 may be the same as, be similar to, and/or correspond to the display 14. The image capture device 302 may include other components not shown in FIG. 3, such as one or more sound sensors. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating images or videos (e.g., video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The display 309 may refer to an electronic device that provides visual presentation of information. The display 309 may include a color display and/or a non-color display. In some implementations, the display 309 may include one or more touchscreen displays. The display 309 may be configured to visually present information. The display 309 may be configured to present visual content, user interface, schedule options, and/or other information. User interface (graphical user interface) may include a graphical form that enables a user to interact with the image capture device 302 and/or see information provided by the image capture device 302. User interface may include one or more schedule options. Schedule option(s) may enable a user to schedule future capture of visual content by the image capture device 302. Schedule option(s) may be included within the user interface as/through one or more user interface elements. User interface elements may refer to components of the user interface. User interface elements may refer to graphical elements of the user interface, such as windows, icons, buttons, graphics, and/or other visual indicators. User interface elements may visually provide information and/or enable a user to provide inputs to the image capture device 302 (by interacting with the user interface elements).

While the image capture device 302 is shown as having one display, this is merely as an example and is not meant to be limiting. In some implementations, the image capture device may include multiple displays. For example, the image capture device 302 may include a rear-facing display (e.g., the display 309) and a front-facing display. The front-facing display may enable a user to see visual content being captured by the image capture device 302, the user interface, schedule options, and/or other information while the image capture device 302 is pointed towards the user. For example, one or more schedule options and/or information about scheduled capture of visual content may be presented on one or both of the front-facing display and the rear-facing display.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306. The processor 310 may facilitate transfer of information from the image sensor 306 to another device/component. The processor 310 may be remote from the processor 11 or local to the processor 11. One or more portions of the processor 310 may be remote from the processor 11 and/or one or more portions of the processor 11 may be part of the processor 310. The processor 310 may include and/or perform one or more functionalities of the processor 11 shown in FIG. 1.

The image capture device 302 may present a scheduled capture user interface on the display 309. The scheduled capture user interface may include schedule option(s) for a user to schedule future capture of the visual content, such as by setting a start time at which the image capture device 302 is to start capture of visual content and a capture duration for which the image capture device 302 is to capture the visual content. The image capture device 302 may determine (detect) user interaction with the schedule option(s) to schedule future capture of visual content. Responsive to the user scheduling future capture of visual content (responsive to detection of the user interaction with the schedule option(s) to schedule future capture of visual content), the image capture device 302 may be configured to start capture of the visual content at the start time for the capture duration. Configuration of the image capture device 302 to start capture of the visual content at the start time for the capture duration may allow usage of the image capture device 302 to capture other content before the start time. That is, the user may use the image capture device 302 before the start time without impacting the scheduled capture of visual content. The user may deactivate the image capture device 302, such as by turning off the image capture device 302 or putting the image capture device into a standby mode. When the time approaches the scheduled start time, the image device may be activated for the scheduled capture of visual content. The capture of visual content for the capture duration may be started at the start time. The capture of visual content may include capture of one or more images and/or one or more videos. The capture of visual content may be accompanied by capture of other content, such as audio content, metadata relating to the visual content, metadata relating to the audio content, and/or other content.

Thus, the user may use the schedule option(s) presented within the scheduled capture user interface to prearrange capture of visual content and/or other content in advance. The user may continue to use the camera after scheduling future capture of visual content. The other options may be presented on the display 309 (e.g., within the scheduled capture interface, other user interface). For the user to set and/or change future capture of visual content. For example, option(s) may be presented to enable the user to cancel a scheduled future capture of visual content. Option(s) may be presented to enable the user to set and/or change one or more parameters of a scheduled future capture of visual content (e.g., start time, capture duration, capture setting) before and/or during capture of the visual content.

Referring back to FIG. 1, the processor 11 (or one or more components of the processor 11) may be configured to obtain information to facilitate detecting hand obstructions. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate scheduled capture of video. The machine-readable instructions 100 may include one or more computer program components. The machine-readable instructions 100 may include one or more of a user interface component 102, a user interaction component 104, a scheduled capture component 106, a capture component 108, and/or other computer program components.

The user interface component 102 may be configured to present a scheduled capture user interface and/or other user interface on the display 14. The schedule capture user interface may include one or more graphical user interfaces. A graphical user interface may refer to a user interface that enables a user to interact with the system 10 through one or more user interface element. The scheduled capture user interface may be static or dynamic. The scheduled capture user interface may include a static configuration of user interface elements and/or include dynamic configurations of user interface elements that changes (e.g., with time, based on user interaction with one or more user interface elements). Multiple/different user interface elements may be presented/included within the scheduled capture user interface at the same time, may be presented/included within the scheduled capture interface at different times, and/or may be presented/included within the scheduled capture user interface responsive to user interaction with one or more other user interface elements and/or other information.

The scheduled capture user interface may be separate from other graphical user interface(s) presented on the display 14. For example, the scheduled capture user interface may be a standalone graphical user interface. The scheduled capture user interface may be part of other graphical user interface(s) presented on the display 14. For example, the scheduled capture user interface may be a part of a graphical user interface presenting options to control setting of the image capture device.

A user interface element may refer to a graphical element of the scheduled capture user interface, such as window, icon, button, graphic, and/or other visual indicator. A user interface element may visually provide information and/or enable a user to provide inputs to the system 10. For example, a user interface element may visually provide information determined by the system 10 and/or a user may interact (e.g., engage, toggle, manipulate) with a user interface element to provide one or more input to the system 10. A scheduled capture user interface may facilitate interaction of the user with one or more of the user interface elements via the user input received through one or more user interface devices (e.g., a touchscreen display, a keyboard, a mouse, a trackpad). For example, the scheduled capture user interface may present/include the user interface elements in a particular arrangement and enable the user to interact with individual user interface elements by engaging with locations corresponding to the individual user interface elements on a touchscreen display.

The scheduled capture user interface may include one or more schedule options for a user to schedule future capture of the visual content. A schedule option may refer to an option to set and/or change one or more parameters of scheduled future capture of visual content. The schedule option(s) may enable a user to schedule, change, and/or cancel future capture of visual content by an image capture device. Future capture of visual content by an image capture device may refer to operation of the image capture device to capture visual content at a time later than the present time. The schedule option(s) may be included within the user interface as/through one or more user interface elements. The schedule option(s) may be included within the scheduled capture user interface to enable the user to set or change one or more parameters of scheduled future capture of visual content (e.g., start time, capture duration, capture setting) before and/or during capture of visual content.

User scheduling of the future capture of visual content may include the user setting (1) a start time at which the image capture device is to start capture of the visual content, (2) a capture duration for which the image capture device is to capture the visual content, and/or other parameters of scheduled future capture of visual content. The user may schedule future capture of visual content by interacting with the schedule option(s) to set values of (1) the start time at which the image capture device is to start capture of the visual content, (2) the capture duration for which the image capture device is to capture the visual content, and/or other parameters. Thus, the user may use the scheduled capture user interface to schedule the image capture device to record starting at a certain time for a certain duration.

The schedule option(s) may allow the user to set the start time by allowing the user to specify a specific time (e.g., 2:30 PM) at which the visual content capture is to start and/or to specify a countdown duration (e.g., 15 minutes) after which the visual content capture is to start. In some implementations, the schedule option(s) may allow the user to set the value of the start time up to 24 hours in advance. The schedule option(s) may allow the user to set the capture duration by allowing the user to specify a specific capture duration (e.g., 30 minutes) for which the image capture device is to capture the visual content (from the star time) and/or to specify a specific time (e.g., 3:00 PM) at which the visual content capture is to end.

For example, the schedule option(s) for the user to schedule future capture of the visual content may include (1) a start capture option for the user to set the start time at which the image capture device is to start capture of the visual content, (2) a capture duration option for the user to set the capture duration for which the image capture device is to capture the visual content, and/or other options. As another example, the schedule option(s) for the user to schedule future capture of the visual content may include (1) a start capture option for the user to set the start time at which the image capture device is to start capture of the visual content, (2) an end capture option for the user to set an end time at which the image capture device is to end capture of the visual content, and/or other options. The capture duration may be defined by difference between the start capture time and the end capture time.

In some implementations, one or more of the schedule option(s) may be used independently of the other. For example, the user may schedule future capture of visual content by setting the start time without setting the capture duration or the end time. Such usage of the schedule option(s) may result in configuration of the image capture device to start capturing visual content continuously at the start time. As another example, the user may set the capture duration without setting the start time. Such usage of the schedule option(s) may result in configuration of the image capture device to start capturing visual content for the set capture duration when a command is capture visual content is received (e.g., the user pressing record button on the image capture device).

Figure 4A:
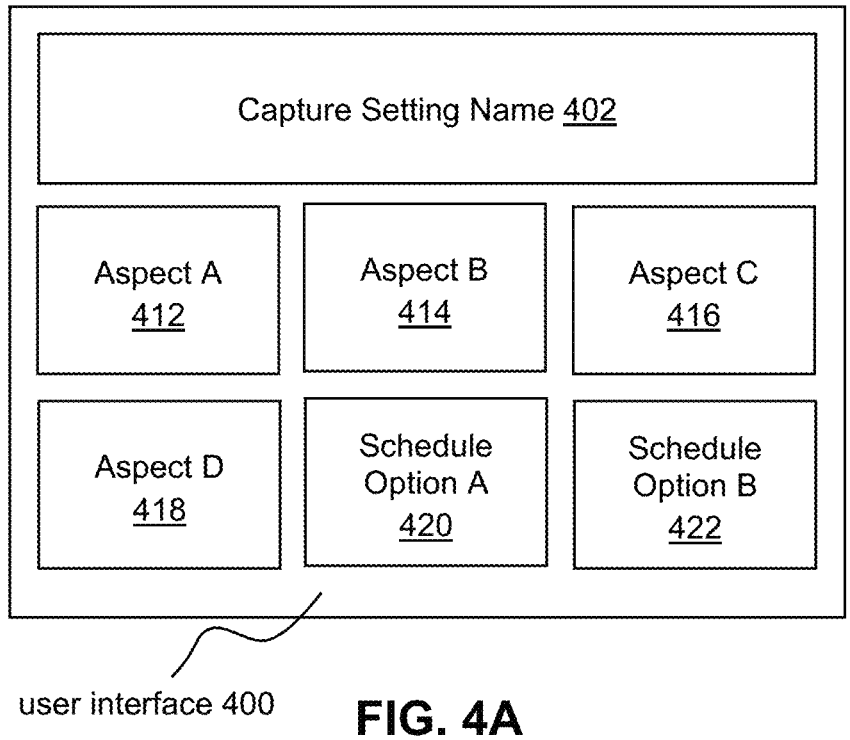
FIGS. 4A and 4B illustrate example user interfaces for scheduling future capture of video.
Figure 4B:
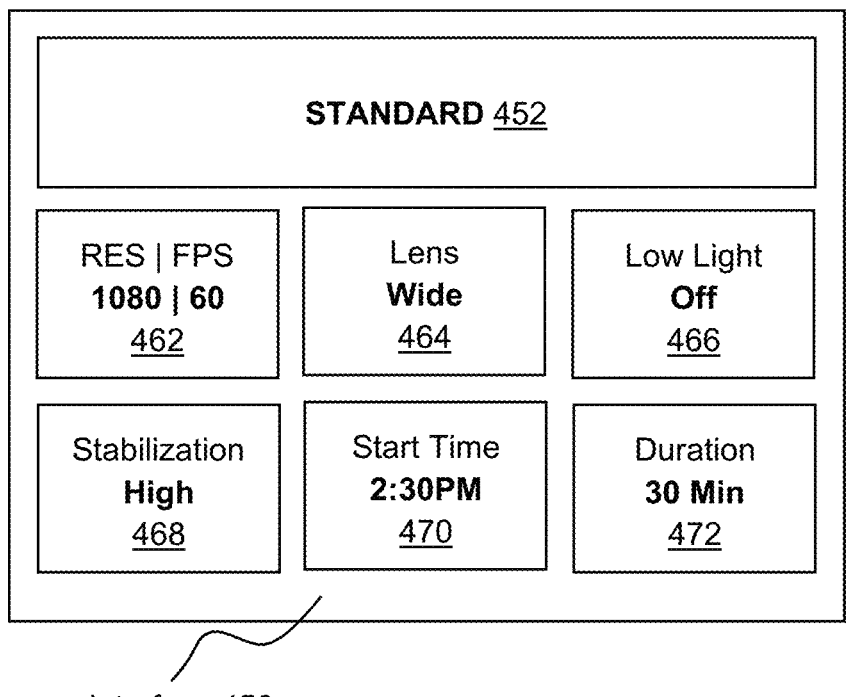

FIGS. 4A and 4B illustrate example user interfaces for scheduling future capture of video. In FIG. 4A, a user interface 400 may include portions 402, 412, 414, 416, 418, 420, 422. The portion 402 may provide information on a name for a capture setting for an image capture device. A user may interact with the portion 402 to set, modify, and/or remove the name for the capture setting. Individual portions 412, 414, 416, 418, 420, 422 may correspond to different aspects of operation for the image capture. A user may interact with one or more of the portions 412, 414, 416, 418, 420, 422 to set, modify, and/or remove particular aspects of operation for the image capture. For example, the portion 420 may provide a schedule option A (e.g., start capture option), and the portion 422 may provide a schedule option B (e.g., capture duration option) for the user to schedule future capture of visual content.

FIG. 4B illustrates an example of different aspects of operation for an image capture defined by a capture setting. In FIG. 4B, an interface 450 may include portions 452, 462, 464, 466, 468, 470, 472. The portion 452 may provide information on a name "STANDARD" for a capture setting. A user may interact with the portion 452 to set, modify, and/or remove the name "STANDARD" for the capture setting. Individual portions 462, 464, 466, 468, 470, 472 may correspond to different aspects of operation for an image capture. A user may interact with one or more of the portions 462, 464, 466, 468, 470, 472 to set, modify, and/or remove particular aspects of operation for the image capture.

For example, the portion 462 may correspond to a resolution and a framerate (frames-per-second) used by the image capture device in capturing visual content. The portion 462 may allow a user to select from among predefined resolutions and/or specify the resolution to be used. The portion 462 may allow a user to select from among predefined framerates and/or specify the framerate to be used. As shown in FIG. 4B, a user may have interacted with the portion 462 to set a resolution of 1080 and a framerate of 60 FPS to capture visual content.

The portion 464 may correspond to a field of view used by the image capture device in capturing visual content. The portion 464 may allow a user to select from among pre-defined fields of view and/or specify the field of view to be used. As shown in FIG. 4B, a user may have interacted with the portion 464 to set a wide field of view to capture visual content.

The portion 466 may correspond to a low light mode of the image capture device in capturing visual content. A low light mode of the image capture device may refer to particular configuration of the image capture device that is tailored for capturing visual content in low light conditions. The portion 466 may allow a user to turn on or off the low light mode of the image capture device. The portion 466 may allow a user to enable the image capture device to control the turning on-off of the low light mode (set to Auto). As shown in FIG. 4B, a user may have interacted with the portion 466 to turn on low light mode.

The portion 468 may correspond to a stabilization mode of the image capture device in capturing visual content. A stabilization mode of the image capture device may refer to processing of the visual content captured by the image capture device to electronic stabilized the visual content. The portion 468 may allow a user to turn on or off the stabilization mode of the image capture device. The portion 468 may allow a user to enable the image capture device to control the turning on-off of the stabilization mode (set to Auto). As shown in FIG. 4B, a user may have interacted with the portion 468 to set the stabilization mode to high.

The portion 470 may correspond to a start capture option for the image capture device. The portion 470 may allow a user to set the start time at which the image capture device is to start capture of the visual content. As shown in FIG. 4B, a user may have interacted with the portion 470 to set the start time as 2:30 PM.

The portion 472 may correspond to capture duration option for the image capture device. The portion 472 may allow a user to set the capture duration for which the image capture device is to capture the visual content from the start time. As shown in FIG. 4B, a user may have interacted with the portion 472 to set the capture duration as 30 minutes. Other user interfaces are contemplated.

In some implementations, the capture duration option may present a user with preset capture durations for selection. For example, the capture duration option may present a user with a set of preset capture durations including 3 hours, 2 hours, 1 hour, 30 minutes, 15 minutes, 5 minutes, 1 minute, 30 seconds, 15 seconds, no limit. In some implementations, a custom capture duration may be presented with present capture durations. Selection of the custom capture duration may allow the user to specify particular capture duration.

Figure 5:
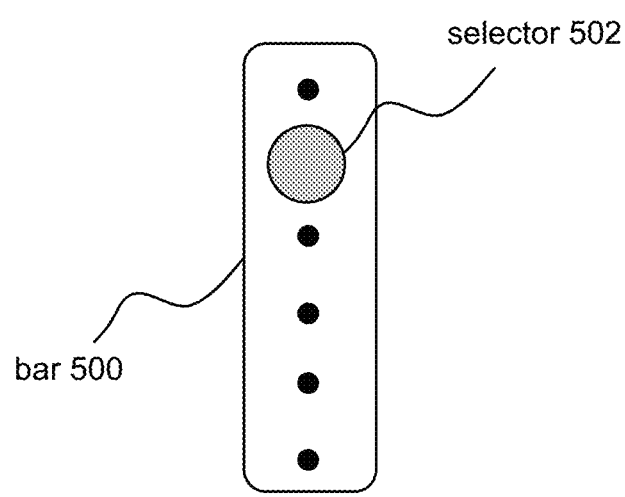
FIG. 5 illustrates an example capture duration option.

FIG. 5 illustrates an example capture duration option. The capture duration option may be presented to allow the user to select the capture duration. The capture duration option may include a bar 500, a selector 502, and/or other user interface elements. The selector 502 may be moveable along the bar 500. Different positions along the bar 500 (indicted by dots) may correspond to different capture durations. A user may set the capture duration for future capture of visual content by placing the selector 502 in a particular position along the bar 500. In some implementations, the capture duration option may be presented in response to user's interaction with the scheduled capture user interface. For example, the capture duration option shown in FIG. 5 may be presented on the display 14 in response to the user interacting with the portion 472 of the user interface 450. Other capture duration options are contemplated.

The user interaction component 104 may be configured to determine user interaction with the schedule option(s) to schedule future capture of visual content. User interaction with the schedule option(s) may include one or more ways in which a user acts towards, influences, engages, manipulates, and/or otherwise interacts with the schedule option(s). User interaction with the schedule option(s) may be determined based on user engagement with one or more user interface devices, such as the display 14, a keyboard, a mouse, a trackpad, and/or other user interface devices. For example, the display 14 may include a touchscreen display and the scheduled capture user interface may be presented on the display 14. A user may interact with the schedule option(s) within the scheduled capture user interface by interacting with one or more touch-sensitive surfaces/screens of the touchscreen display. User interaction with a particular schedule option may be determined based on the location of user engagement with the display 14, with the location of engagement corresponding to particular schedule option.

Determining user interaction with the schedule option(s) to schedule future capture of visual content may include detecting, interpreting, ascertaining, and/or otherwise determining that a user has interacted with the schedule option(s) to schedule future capture of visual content. Determining user interaction with the schedule option(s) to schedule future capture of visual content may include receiving, providing, and/or interpreting commands generated by the image capture device based on user interaction with the schedule option(s) to determine the parameters defining future capture of visual content. For example, the user interaction component 104 may determine which of the schedule option(s) have been interacted by the user (e.g., via tapping in the corresponding location on the display 14) and/or how the schedule option(s) were interacted by the user (e.g., values of start time and/or capture duration selected by the user through the schedule option(s)).

A user may interact with the schedule option(s) to schedule one or multiple future capture of visual content. For example, a user may interact with the schedule option(s) to set a single capture of visual content at a future time. A user may interact with the schedule option(s) to set two or more separate captures of the visual content at different times in the future. In some implementations, a user may be limited to a single scheduled future capture of visual content. In some implementations, change in start time of a scheduled future capture of visual content may result in modification of the previously scheduled future capture of visual content. In some implementations, change in start time of a scheduled future capture of visual content may result in cancellation of the previously scheduled future capture of visual content and creation of a new scheduled future capture of visual content may result in cancellation of the previously scheduled future capture of visual content.

The scheduled capture component 106 may be configured to, responsive to the user scheduling the future capture of the visual content, configure the image capture device to start capture of the visual content at the start time for the capture duration. Configuring the image capture device may include setting up the image capture device. Configuration the image capture device may include specifying and/or changing one or more settings of the image capture device. Configurating the image capture device to start capture of the visual content at the start time for the capture duration may include specifying and/or changing one or more settings of the image capture device so that visual capture by the image capture device is automatically started at the start time, and continues for the capture duration. Configurating the image capture device to start capture of the visual content at the start time for the capture duration may include configuration the image capture device to start capture of other content, such as audio content, at the start time for the capture duration.

Configuration of the image capture device to start capture of the visual content at the start time for the capture duration may allow usage of the image capture device to capture other content before the start time. That is, rather than locking the image capture device in a future capture mode and preventing other usage of the image capture device, the configuration of the image capture device to start capture of the visual content at the start time for the capture duration may not impact the usage of the image capture device prior to the start time. A user may use the image capture device normally between time at which future capture of visual content is schedule and the start time at which the visual content capture begins. For example, a use may use the image capture device to capture visual content, audio content, and/or other content. A user may change one or more settings of the image capture device for interim use of the image capture device without impacting the scheduled future capture of visual content. For example, the user may change the resolution and/or the frame rate at which visual content is captured without impacting the scheduled future capture of visual content. In some implementations, a message may be presented to the user on the display 14 based on the currently capture setting of the image capture device being different from the capture setting to be used with scheduled future capture of visual content. For example, a message may be presented stating that future capture of visual content has been set using a different capture setting. The message may include information about the future capture of visual content, such as the start time and the capture duration. In some implementations, the message may act as a shortcut. For example, tapping on the message may take the user to the capture setting for the future capture of visual content.

In some implementations, a user may be allowed to deactivate the image capture device, such as by turning off the image capture device or putting the image capture device into a standby mode. In some implementations, one or more messages may be presented to the user on the display 14 that the image capture device may be deactivated to conserved battery. In some implementations, the message(s) may act as a shortcut. For example, tapping on the message(s) may deactivate the image capture device.

Figure 6A:
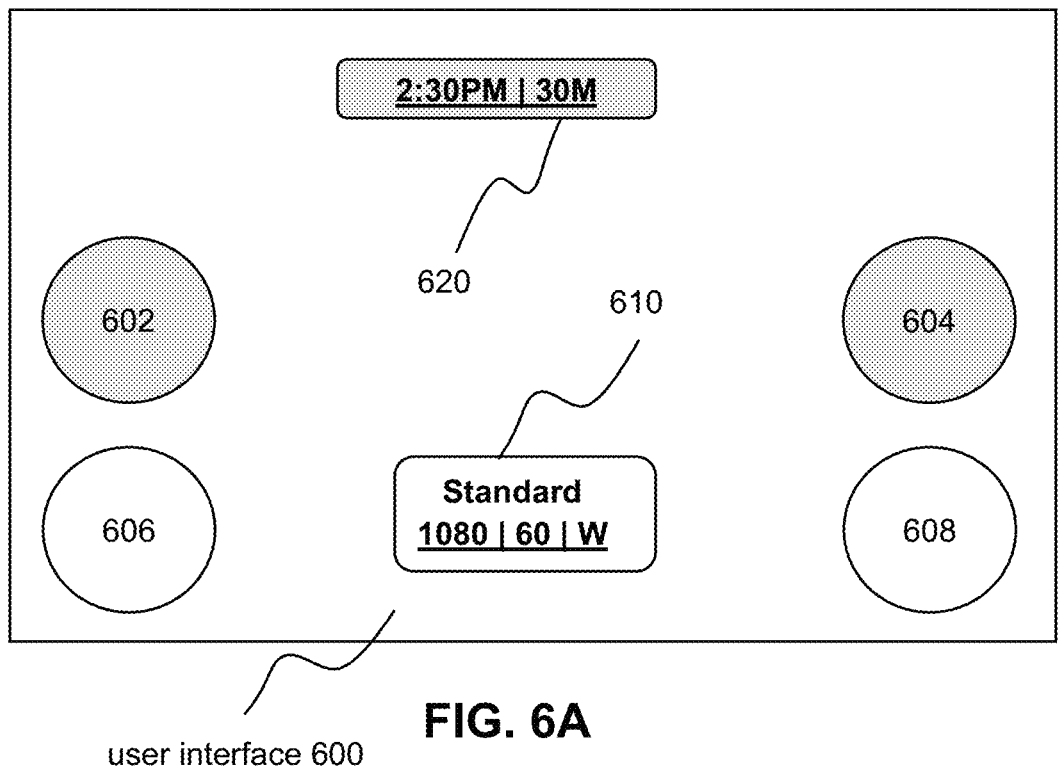
FIGS. 6A and 6B illustrate example user interfaces for scheduled future capture of video.
Figure 6B:
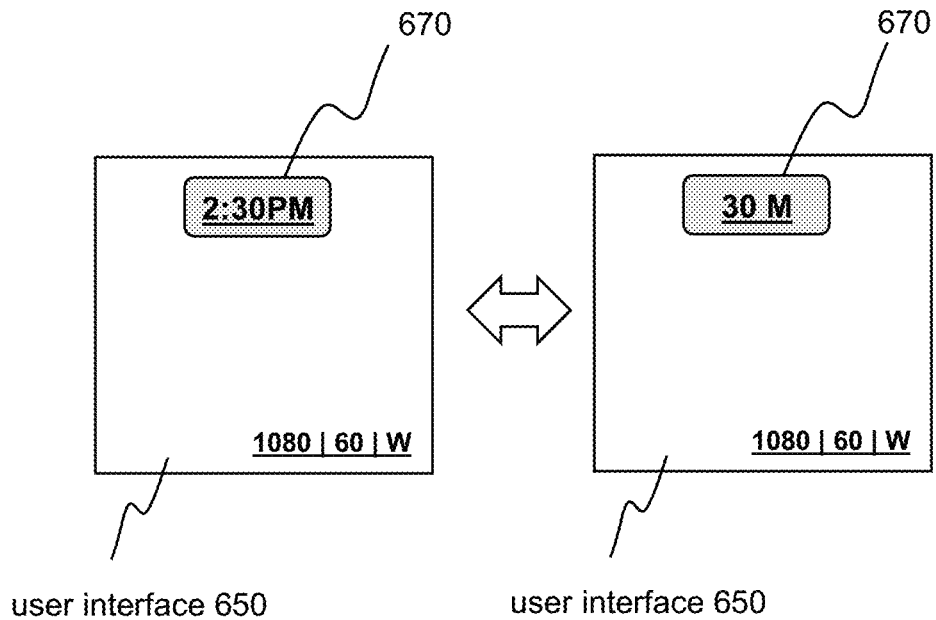

Information on scheduled future capture of visual content may be presented on the display 14. FIGS. 6A and 6B illustrate example user interfaces for scheduled future capture of video. FIG. 6A may illustrate an example user interface presented on a rear-facing display (e.g., rectangular display) and FIG. 6B may illustrate an example user interface presented on a front-facing display (e.g., square display). The user interfaces may provide preview of visual content to be/being captured by the image capture device.

In FIG. 6A, a user interface 600 may include portions 602, 604, 606, 608, 610, 620. The portion 602 may provide information on whether or not the start time for future capture of visual content has been set. For example, the portion 602 may be colored differently and/or presented with different patterns based on whether or not the start time for future capture of visual content has been set. In some implementations, the portion 602 may be colored differently and/or presented with different patterns based on the value of the start time. In some implementations, the portion 602 may display the start time. In some implementations, a user may interact with the portion 602 to set, cancel, and/or change the start time.

The portion 604 may provide information on whether or not the capture duration for future capture of visual content has been set. For example, the portion 604 may be colored differently and/or presented with different patterns based on whether or not the capture duration for future capture of visual content has been set. In some implementations, the portion 604 may be colored differently and/or presented with different patterns based on the lengths of the capture duration. In some implementations, the portion 604 may display the capture duration. In some implementations, a user may interact with the portion 604 to set, cancel, and/or change the capture duration.

The portions 606, 608 may provide information on other settings and/or operations of the image capture device. For example, the portions 606, 608 may provide information on one or more capture settings to be/being used and/or controls to change how visual content is captured (e.g., zoom button).

The portion 610 may provide information on capture setting of the image capture device. The portion 610 may provide information on current capture setting of the image capture device and/or capture setting to be used with scheduled future capture of visual content. For example, as shown in FIG. 6A, the portion 610 may show that the image capture device has been configured to used Standard capture setting (e.g., resolution of 1080, framerate of 60, wide field of view capture). The portion 620 may provide information on the start time and/or the capture duration for future capture of visual content. For example, the portion 620 may specify the start time at which the capture of visual content will start and/or the capture duration for which the visual content will be captured. The user interface 600 may provide other information.

In FIG. 6B, a user interface 650 may include a portion 670. The portion 670 may provide information on whether or not the start time for future capture of visual content has been set and/or whether or not the capture duration for future capture of visual content has been set. For example, the portion 670 may alternate between displaying the start time and the capture duration for future capture of visual content. In some implementations, a user may interact with the portion 670 to set, cancel, and/or change the start time. In some implementations, a user may interact with the portion 670 to set, cancel, and/or change the capture duration. The user interface 650 may provide other information, such as the capture setting of the image capture device as shown in the lower right corner of the user interface 650.

In some implementations, responsive to the image capture device being on proximate to the start time, a scheduled capture alert may be presented on the display 14. Proximate to the start time may refer to a time that is within a certain time duration of the start time. For example, current time of the image capture device may be proximate to the start time based on the current time of the image capture device being within a certain time duration (e.g., 30 seconds) of the start time. If the image capture device is on (activated) at that time, the scheduled capture alert may be presented on the display 14. The schedule capture alert may refer to visual alert that provides information on the upcoming scheduled future capture of visual content. The scheduled capture alert may include a countdown to the start time, the capture duration, and/or other information about the scheduled future capture of visual content.

For example, in FIG. 6A, the information provided within the portion 620 may change. For example, proximate to the start time (e.g., when current time of the image capture device is within a certain time duration, such as 30 seconds, of the start time), the portion 620 may change to provide a timer that counts down to start of the scheduled capture of visual content. The timer may be provided in place of or in addition to the start time. In FIG. 6B, the information provided within the portion 620 may change. For example, proximate to the start time (e.g., when current time of the image capture device is within a certain time duration, such as 30 seconds, of the start time), the portion 620 may change to provide a timer that counts down to start of the scheduled capture of visual content. The timer may be provided in place of or in addition to the start time.

In some implementations, responsive to the image capture device being deactivated proximate to the start time, the image capture device may be activated for the scheduled future capture of the visual content. For example, responsive to the image capture device being off proximate to the start time, the image capture device may be turned on for the scheduled future capture of the visual content. Responsive to the image capture device being in a standby mode proximate to the start time, the image capture device may come out of the standby mode for the scheduled future capture of the visual content. Thus, as the scheduled recording time approaches, the image capture device may automatically activate so that it will be ready to record for the capture duration at the start time.

In some implementations, one or more modify options may be presented for the user (1) to modify the start time at which the image capture device is to start the capture of the visual content, and/or (2) to modify the capture duration for which the image capture device is to capture the visual content. For example, quick buttons (e.g., such as the portions 602, 604 shown in FIG. 6A) may be provided so that the user may change the time at which the image capture device should start capture and the duration of the capture. In some implementations, the modify option to change the capture duration may be presented during capture of the visual content, enabling the user to change the capture duration after the scheduled future capture of visual content has started.

The capture component 108 may be configured to start the capture of the visual content for the capture duration at the start time. Capture of the visual content may be stopped after passage of the capture duration. Capturing visual content may include using, recording, storing, and/or otherwise capturing the visual content. In some implementations, the visual content may be captured for use in generating one or more images. In some implementations, the visual content may be captured for use in generating one or more videos (e.g., video frames). The visual content may be captured for the capture duration. For example, recording of the visual content may begin at the start time and continue for the capture duration. The capture component 108 may be configured to start the capture of other content for the capture duration at the start time. Capture of other content may be stopped after passage of the capture duration.

For example, beginning at the start time and for the capture duration, the capture component 102 may use the visual output signal generated by the image sensor(s) and/or the visual information conveyed by the visual output signal to record, store, and/or otherwise capture the visual content. For instance, the capture component 102 may store, in the electronic storage 13 and/or other (permanent and/or temporary) electronic storage medium, information (e.g., the visual information) defining the visual content based on the visual output signal generated by the image sensor(s) and/or the visual information conveyed by the visual output signal during the capture duration. In some implementations, information defining the captured visual content may be stored in one or more visual tracks.

In some implementations, one or more modify options to modify setting of the image capture device in capturing visual content may be enabled during capture of the visual content. For example, the modify option(s) to modify the capture duration for which the image capture device is to capture the visual content may be enabled during capture of the visual content. For instance, a user may use the modify option(s) to change the length of the scheduled capture while the scheduled capture is active/ongoing.

Figure 7A:
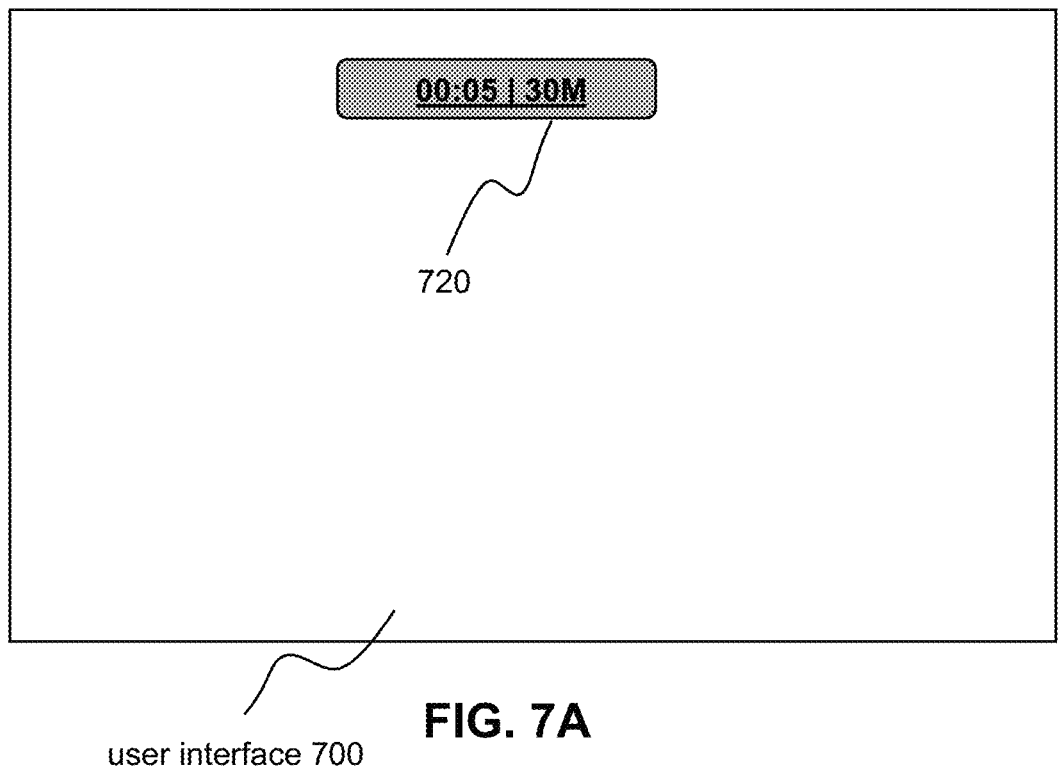
FIGS. 7A and 7B illustrate example user interfaces for capture during scheduled future capture of video.
Figure 7B:
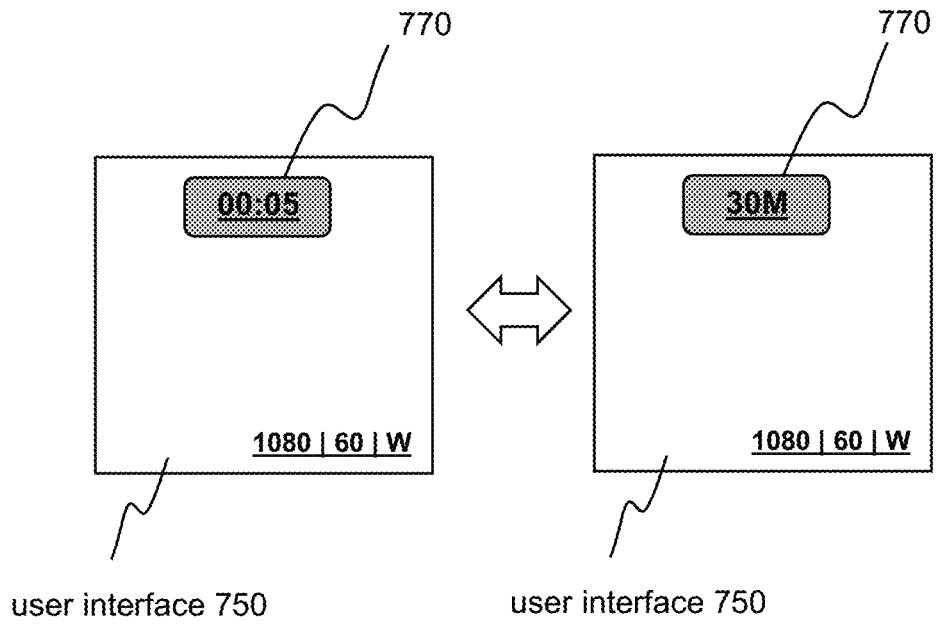

Information on active scheduled future capture of visual content may be presented on the display 14. FIGS. 7A and 7B illustrate example user interfaces for capture during scheduled future capture of video. FIG. 7A may illustrate an example user interface presented on a rear-facing display (e.g., rectangular display) and FIG. 7B may illustrate an example user interface presented on a front-facing display (e.g., square display). The user interfaces may provide preview of visual content to being captured by the image capture device.

In FIG. 7A, the user interface 700 may include a portion 720. The portion 720 may provide information on the amount of time elapsed in the capture of the visual content (elapsed recording time) and/or the capture duration (total duration of recording). For example, as shown in FIG. 7A, the portion 720 may display 00:05 to indicate that recording has been activated for 5 minutes. The portion 720 may display 30 M to indicate that total duration of recording is 30 minutes. In some implementations, the portion 720 may be colored differently and/or presented with different patterns than the portion 620 (shown in FIG. 6A) based on whether or not the scheduled capture has been activated. For example, the portion 620 may be colored in blue before the scheduled capture has been activated and the portion 720 may be colored in red once the scheduled capture has been activated.

In FIG. 7B, a user interface 750 may include a portion 770. The portion 720 may provide information on the amount of time elapsed in the capture of the visual content (elapsed recording time) and/or the capture duration (total duration of recording). For example, as shown in FIG. 7B, the portion 770 may alternate between displaying the elapsed recording time (00:05) and the total duration of recording (30 M). In some implementations, the portion 770 may be colored differently and/or presented with different patterns than the portion 670 (shown in FIG. 6B) based on whether or not the scheduled capture has been activated. For example, the portion 670 may be colored in blue before the scheduled capture has been activated and the portion 770 may be colored in red once the scheduled capture has been activated.

In some implementations, the scheduled future capture of visual content may be associated with a capture setting before the start time. The capture of the visual content may be performed by the image capture device using the capture setting. In some implementations, the scheduled future capture of visual content may be associated with a capture setting based on user selection of the capture setting for the scheduled future capture of visual content. For example, a user may schedule a future recording visual content to be performed with particular capture setting. The capture setting associated with scheduled future capture of visual content may include a preset capture setting (e.g., a preset capture setting selected by the user) or a custom capture setting (e.g., a custom capture setting selected by the user). If the current capture setting of the image capture device is different from the associated capture setting, the capture setting of the image capture device may be changed to the associated capture setting for the scheduled future capture of visual content. In some implementations, the capture setting of the image capture device may revert to the prior (original) capture setting after the scheduled future capture of visual content has finished.

In some implementations, the capture setting associated with the scheduled future capture of the visual content may be visually identified in a list of capture settings. For example, the capture setting associated with the scheduled future capture of the visual content may be visually identified by a clock icon in a list of capture settings. Use of other visual indicators to identify the associated capture setting are contemplated.

Figure 8:
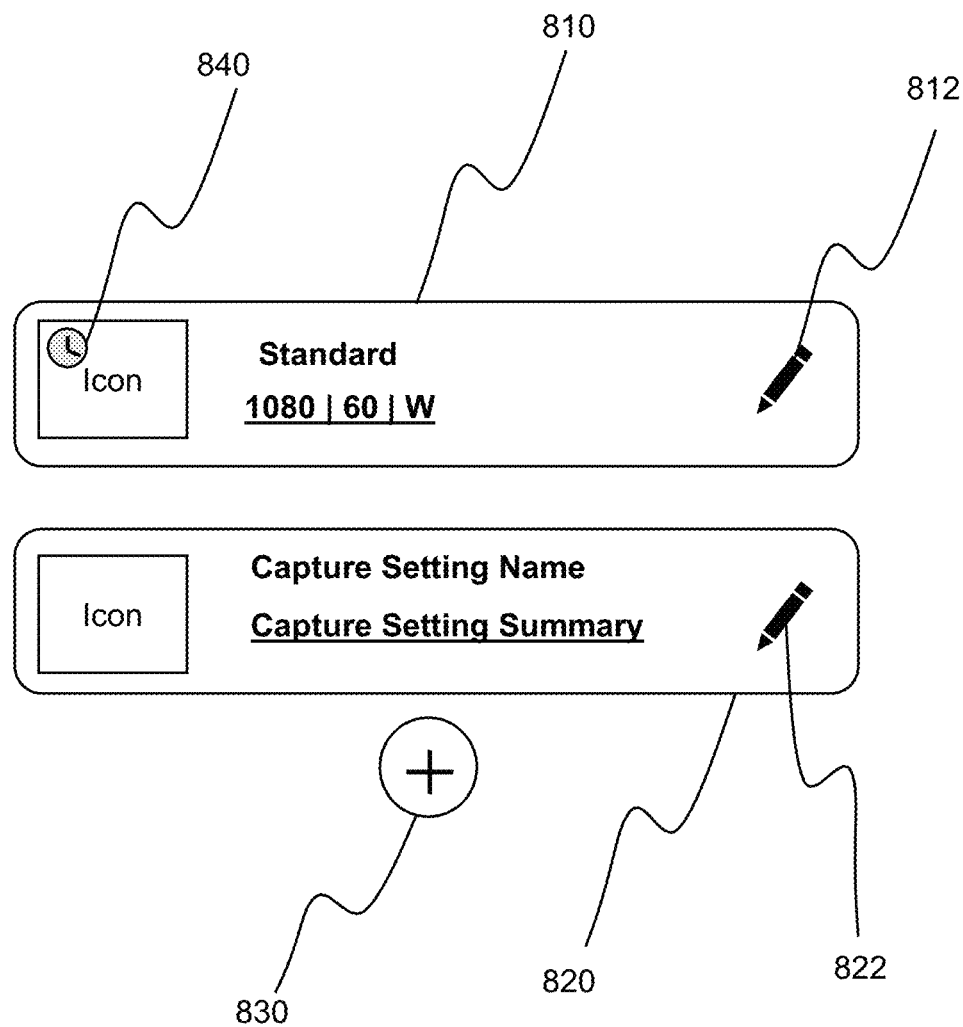
FIG. 8 illustrates an example list of capture settings.

FIG. 8 illustrates an example list of capture settings. In FIG. 8, the list may include two capture settings. Other number capture settings may be included in the list. The capture settings included in the list may include capture settings stored in the image capture device (e.g., as presets). The list of capture settings may include one or more visual representations 810, 820 of the capture settings. For example, the visual representations 810, 820 of the capture settings may include icons corresponding to the capture settings, names corresponding to the capture settings, and summaries (e.g., resolution, framerate, field of view) corresponding to the capture settings. The standard capture setting may be associated with scheduled future capture of visual content. The association between the standard capture setting and the scheduled future capture of visual content may be visually indicated by a clock icon 840. Other appearances of capture settings are contemplated.

The list of capture settings may include options 812, 822. The options 812, 822 may enable a user to modify the capture settings (e.g., change one or more aspects of image capture device operations defined by a capture setting, delete a capture setting). The list of capture settings may include and/or be accompanied by an option 830. The option 830 may enable a user to add a new capture setting to the image capture device. Other listings of capture settings are contemplated.

In some implementations, a single capture setting may be associated with multiple scheduled future capture of visual content. In some implementations, different capture settings may be associated with different scheduled future capture of visual content. In some implementations, only one capture setting may be associated with scheduled future capture of visual content. Using schedule option(s) to associate another capture setting with future capture of visual content may result in cancellation of previously existing association between a capture setting and future capture of visual content.

In some implementations, the scheduled future capture of visual content may not be associated with a capture setting before the start time. The capture of the visual content may be performed by the image capture device using the current capture setting. That is, rather than using a specific capture setting selected for the scheduled future of visual content, the image capture device may use its current capture setting to start capturing the visual content at the start time.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
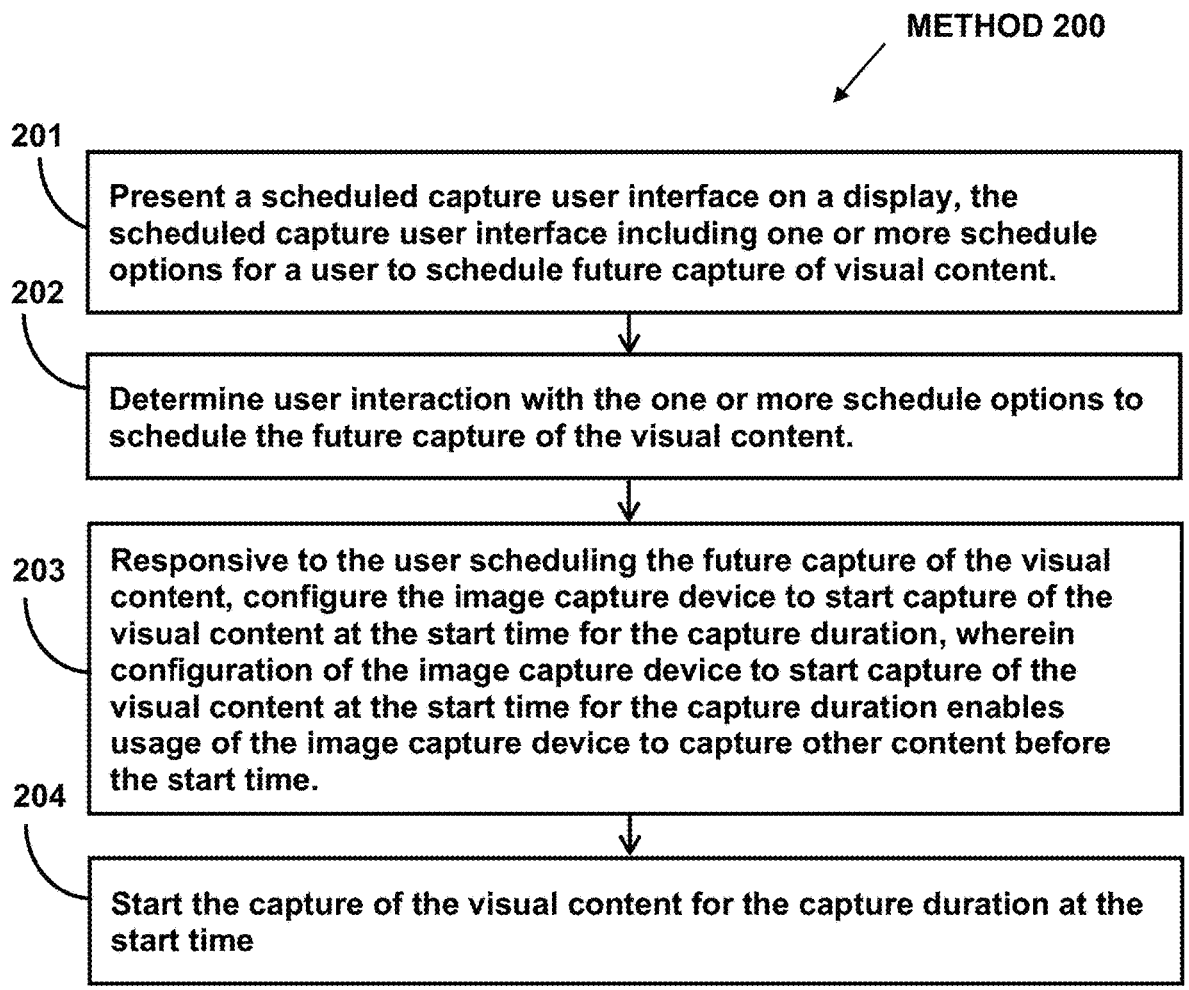
FIG. 2 illustrates an example method for scheduling future capture of video.

FIG. 2 illustrates method 200 for scheduling future capture of video. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a display, and/or other components. The optical element may guide light within a field of view to the image sensor. The image sensor may generate a visual output signal conveying visual information based on light that becomes incident thereon. The visual information may define visual content. The display may be configured to visually present information.

At operation 201, a scheduled capture user interface may be presented on the display. The scheduled capture user interface may include one or more schedule options for a user to schedule future capture of the visual content. User scheduling of the future capture of the visual content may include the user setting a start time at which the image capture device is to start capture of the visual content and a capture duration for which the image capture device is to capture the visual content. In some implementation, operation 201 may be performed by a processor component the same as or similar to the user interface component 102 (Shown in FIG. 1 and described herein).

At operation 202, user interaction with the one or more schedule options to schedule the future capture of the visual content may be determined. In some implementations, operation 202 may be performed by a processor component the same as or similar to the user interaction component 104 (Shown in FIG. 1 and described herein).

At operation 203, responsive to the user scheduling the future capture of the visual content, the image capture device may be configured to start capture of the visual content at the start time for the capture duration. Configuration of the image capture device to start capture of the visual content at the start time for the capture duration may allow usage of the image capture device to capture other content before the start time. In some implementations, operation 203 may be performed by a processor component the same as or similar to the scheduled capture component 106 (Shown in FIG. 1 and described herein).

At operation 204, the capture of the visual content for the capture duration may be started at the start time. In some implementations, operation 204 may be performed by a processor component the same as or similar to the capture component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for enabling scheduled capture of video, the system comprising:
a first display;
a second display smaller than the first display; and
one or more physical processors configured by machine-readable instructions to:
present information on scheduled future capture of visual content by an image capture device on the first display and the second display, the image capture device configured to start capture of the visual content at a start time for a capture duration, wherein before the start time, the start time and the capture duration for the scheduled future capture of the visual content are simultaneously presented on the first display and the start time and the capture duration for the scheduled future capture of the visual content are alternatively presented on the second display; and
present information on the capture of the visual content on the first display and the second display, wherein after the start time, an amount of time elapsed in the capture of the visual content and the capture duration for which the image capture device is to capture the visual content are simultaneously presented on the first display and the amount of time elapsed in the capture of the visual content and the capture duration for which the image capture device is to capture the visual content are alternatively presented on the second display.

2. The system of claim 1, wherein responsive to time of the image capture device being proximate to the start time, a scheduled capture alert is presented on the first display, the scheduled capture alert including a countdown to the start time.

3. The system of claim 1, wherein the scheduled future capture of the visual content is associated with a capture setting before the start time, and the capture of the visual content is performed by the image capture device using the capture setting.

4. The system of claim 1, wherein the scheduled future capture of the visual content is not associated with a capture setting before the start time, and the capture of the visual content is performed by the image capture device using a current capture setting.

5. The system of claim 1, wherein responsive to the image capture device being off or in a standby mode proximate to the start time, the image capture device is activated for the scheduled future capture of the visual content.

6. The system of claim 1, wherein the one or more physical processors are further configured by the machine-readable instructions to present a user interface for scheduling the future capture of visual content by the image capture device, the user interface including a first portion that provides an option to set the start time at which the image capture device is to start the capture of the visual content, wherein value of the start time is presented within the first portion.

7. The system of claim 6, wherein the user interface further includes a second portion that provides an option to set the capture duration for which the image capture device is to capture the visual content, wherein value of the capture duration is presented within the second portion.

8. The system of claim 7, wherein the option to set the capture duration for which the image capture device is to capture the visual content includes a bar and a selector movable to different positions along the bar, the different positions along the bar corresponding to different capture durations.

9. The system of claim 1, wherein one or more modify options are presented on the first display for user modification of the start time at which the image capture device is to start the capture of the visual content and the capture duration for which the image capture device is to capture the visual content.

10. A method for enabling scheduled capture of video, the method performed by computing system including one or more processors, a first display, and a second display smaller than the first display, the method comprising:
presenting, by the computing system, information on scheduled future capture of visual content by an image capture device on the first display and the second display, the image capture device configured to start capture of the visual content at a start time for a capture duration, wherein before the start time, the start time and the capture duration for the scheduled future capture of the visual content are simultaneously presented on the first display and the start time and the capture duration for the scheduled future capture of the visual content are alternatively presented on the second display; and
presenting, by the computing system, information on the capture of the visual content on the first display and the second display, wherein after the start time, an amount of time elapsed in the capture of the visual content and the capture duration for which the image capture device is to capture the visual content are simultaneously presented on the first display and the amount of time elapsed in the capture of the visual content and the capture duration for which the image capture device is to capture the visual content are alternatively presented on the second display.

11. The method of claim 10, wherein responsive to time of the image capture device being proximate to the start time, a scheduled capture alert is presented on the first display, the scheduled capture alert including a countdown to the start time.

12. The method of claim 10, wherein the scheduled future capture of the visual content is associated with a capture setting before the start time, and the capture of the visual content is performed by the image capture device using the capture setting.

13. The method of claim 10, wherein the scheduled future capture of the visual content is not associated with a capture setting before the start time, and the capture of the visual content is performed by the image capture device using a current capture setting.

14. The method of claim 10, wherein responsive to the image capture device being off or in a standby mode proximate to the start time, the image capture device is activated for the scheduled future capture of the visual content.

15. The method of claim 10, further comprising:
presenting, by the computing system, a user interface for scheduling the future capture of visual content by the image capture device, the user interface including a first portion that provides an option to set the start time at which the image capture device is to start the capture of the visual content, wherein value of the start time is presented within the first portion.

16. The method of claim 15, wherein the user interface further includes a second portion that provides an option to set the capture duration for which the image capture device is to capture the visual content, wherein value of the capture duration is presented within the second portion.

17. The method of claim 16, wherein the option to set the capture duration for which the image capture device is to capture the visual content includes a bar and a selector movable to different positions along the bar, the different positions along the bar corresponding to different capture durations.

18. The method of claim 10, wherein one or more modify options are presented on the first display for user modification of the start time at which the image capture device is to start the capture of the visual content and the capture duration for which the image capture device is to capture the visual content.

19. A system for enabling scheduled capture of video, the system comprising:
a first display;
a second display smaller than the first display; and
one or more physical processors configured by machine-readable instructions to:
present information on scheduled future capture of visual content by an image capture device on the first display and the second display, the image capture device configured to start capture of the visual content at a start time for a capture duration, wherein before the start time, the start time and the capture duration for the scheduled future capture of the visual content are simultaneously presented on the first display and the start time and the capture duration for the scheduled future capture of the visual content are alternatively presented on the second display; and
present information on the capture of the visual content on the first display and the second display, wherein after the start time, an amount of time elapsed in the capture of the visual content and the capture duration for which the image capture device is to capture the visual content are simultaneously presented on the first display and the amount of time elapsed in the capture of the visual content and the capture duration for which the image capture device is to capture the visual content are alternatively presented on the second display;
wherein responsive to time of the image capture device being proximate to the start time, a scheduled capture alert is presented on the first display, the scheduled capture alert including a countdown to the start time.

20. The system of claim 19, wherein the one or more physical processors are further configured by the machine-readable instructions to present a user interface for scheduling the future capture of visual content by the image capture device, the user interface including:
a first portion that provides an option to set the start time at which the image capture device is to start the capture of the visual content, wherein value of the start time is presented within the first portion; and
a second portion that provides an option to set the capture duration for which the image capture device is to capture the visual content, wherein value of the capture duration is presented within the second portion.

* * * * *